(12) United States Patent
Cornett et al.

(10) Patent No.: US 11,681,625 B2
(45) Date of Patent: Jun. 20, 2023

(54) RECEIVE BUFFER MANAGEMENT

(71) Applicant: Intel Corporation, Santa Clara, CA (US)

(72) Inventors: Linden Cornett, Portland, OR (US); Parthasarathy Sarangam, Portland, OR (US); Jesse Brandeburg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 16/716,412

(22) Filed: Dec. 16, 2019

(65) Prior Publication Data

US 2020/0117605 A1  Apr. 16, 2020

Related U.S. Application Data

(60) Provisional application No. 62/782,611, filed on Dec. 20, 2018.

(51) Int. Cl.
*G06F 12/0842* (2016.01)
*H04L 49/00* (2022.01)
(Continued)

(52) U.S. Cl.
CPC ...... *G06F 12/0842* (2013.01); *H04L 49/3018* (2013.01); *H04L 49/3036* (2013.01);
(Continued)

(58) Field of Classification Search
CPC ......... G06F 12/0842; G06F 2212/1041; G06F 2212/6042; G06F 13/382; G06F 13/28;
(Continued)

(56) References Cited

U.S. PATENT DOCUMENTS 6,625,710 B2 * 9/2003 Bonola ................. G06F 12/023
711/171
7,139,873 B1 * 11/2006 Ruster ................... G06F 3/0676
711/111

(Continued)

OTHER PUBLICATIONS

Cox, "Network Buffers and Memory Management", Linux Journal, https://www.linuxjournal.com/article/1312, Oct. 1, 1996, 17 pages.

(Continued)

*Primary Examiner* — Wutchung Chu
(74) *Attorney, Agent, or Firm* — Compass IP Law PC

(57) ABSTRACT

Examples described herein can be used to allocate replacement receive buffers for use by a network interface, switch, or accelerator. Multiple refill queues can be used to receive identifications of available receive buffers. A refill processor can select one or more identifications from a refill queue and allocate the identifications to a buffer queue. None of the refill queues is locked from receiving identifications of available receive buffers but merely one of the refill buffers is accessed at a time to provide identifications of available receive buffers. Identifications of available receive buffers from the buffer queue are provide to the network interface, switch, or accelerator to store content of received packets.

20 Claims, 9 Drawing Sheets

(51) Int. Cl.
*H04L 49/9005* (2022.01)
*H04L 49/90* (2022.01)

(52) U.S. Cl.
CPC ...... *H04L 49/9005* (2013.01); *H04L 49/9068* (2013.01); *G06F 2212/1041* (2013.01); *G06F 2212/6042* (2013.01)

(58) Field of Classification Search
CPC ............. H04L 49/3018; H04L 49/3036; H04L 49/9005; H04L 49/9068; H04L 67/02; H04L 49/9047; G06N 3/063
See application file for complete search history.

(56) References Cited

U.S. PATENT DOCUMENTS

| | | | | |
|---|---|---|---|---|
| 7,180,887 | B1* | 2/2007 | Schwaderer | H04L 49/9094 709/201 |
| 8,073,994 | B2* | 12/2011 | Roberts | H04L 49/90 709/212 |
| 9,727,512 | B1* | 8/2017 | Swartzentruber | G06F 3/0613 |
| 10,523,576 | B1* | 12/2019 | Matthews | H04L 47/6255 |
| 10,924,483 | B2* | 2/2021 | Pope | H04L 49/9063 |
| 2003/0081542 | A1* | 5/2003 | Goetzinger | H04L 49/901 370/412 |
| 2004/0049613 | A1* | 3/2004 | Kim | H04L 49/90 710/52 |
| 2004/0090914 | A1* | 5/2004 | Briscoe | H04L 69/167 370/229 |
| 2004/0184470 | A1* | 9/2004 | Holden | H04L 49/25 370/412 |
| 2005/0138161 | A1* | 6/2005 | McDaniel | H04L 49/90 709/223 |
| 2005/0213570 | A1* | 9/2005 | Stacy | H04L 49/90 370/389 |
| 2006/0045090 | A1* | 3/2006 | Ronciak | H04L 69/16 370/235 |
| 2007/0002880 | A1* | 1/2007 | Chien | H04L 49/901 370/465 |
| 2007/0008959 | A1* | 1/2007 | Radulescu | H04L 47/39 370/383 |
| 2008/0112423 | A1* | 5/2008 | Christenson | H04L 49/901 370/252 |
| 2008/0244118 | A1* | 10/2008 | Accapadi | G06F 12/023 710/56 |
| 2009/0016350 | A1* | 1/2009 | Matsuo | H04L 49/901 370/392 |
| 2011/0035522 | A1* | 2/2011 | Tan | G06F 13/28 711/100 |
| 2015/0370535 | A1* | 12/2015 | Ralston | H04L 49/901 710/310 |
| 2017/0046099 | A1* | 2/2017 | DeJong | G06F 3/0619 |
| 2018/0052659 | A1* | 2/2018 | Thomas | G06F 13/404 |
| 2018/0183733 | A1* | 6/2018 | Dcruz | G06F 3/0679 |
| 2019/0044871 | A1* | 2/2019 | Hu | H04L 47/30 |
| 2020/0151120 | A1* | 5/2020 | Thyamagondlu | G06F 13/4027 |
| 2021/0400124 | A1* | 12/2021 | Pardo | H04L 69/324 |

OTHER PUBLICATIONS

Microsoft, "Introduction to Receive Side Scaling." Microsoft Docs, https://docs.microsoft.com/en-us/windows-hardware/drivers/network/introduction-to-receive-side-scaling, Apr. 20, 2017, 5 pages.

Zhang, et al, "Fast and Scalable Queue-Based Resource Allocation Lock on Shared-Memory Multiprocessors", Department of EEGS, University of Central Florida, Orlando, FL 32816, USA, 2. Sandia National Laboratories, Livermore, CA 94551, USA, Dec. 2013, 23 pages.

Liu, Yujie, et al., "A Lock-Free, Array-Based Priority Queue", Department of Computer Science and Engineering Lehigh University, Technical Report, Mar. 1, 2012, 21 pages.

Valois, John D., "Implementing Lock-Free Queues", To appear in Proceedings of the Seventh International Conference on Parallel and Distributed Computing Systems, Law Vegas, NV, Oct. 1994, 9 pages.

* cited by examiner

RECEIVE BUFFER MANAGEMENT

RELATED APPLICATION

The present application claims the benefit of the priority date of U.S. provisional patent application Ser. No. 62/782,611, filed Dec. 20, 2018, the entire disclosure of which is incorporated herein by reference.

DESCRIPTION

A computing platform can communicate with other computing platforms using wired or wireless network medium. In many cases, the computing platform can use a network interface device to interface with a network medium. Packets received from the network medium can be allocated into buffers representing allocated regions of memory or into a processor cache. Data structures called descriptors can be provided by the computing platform to the network interface to identify available regions of memory or cache that are available to store received packets. For a received packet or packets, the network interface device can modify the descriptor to indicate properties of the received packet and provide the modified descriptor to the computing platform (e.g., processor). After contents of a packet have been processed or consumed, the destination buffer can be freed for other uses or to store other packets.

DETAILED DESCRIPTION

In some approaches, destination buffers are allocated for use to store received packets by a network interface device by providing descriptors that reference free destination buffers (available to store a portion of a received packet) to a buffer queue and using the buffer queue to provide descriptors to the network interface device. Various approaches include: (1) using a single core to allocate all available buffers to the buffer queue and (2) allocating buffers which will be posted to the buffer queue using any of multiple cores but locking the buffer queue (e.g., permitting a single processor to access the buffer queue by use of a lock indicator) when a core posts buffers to the buffer queue. However, using a single core to allocate all buffers puts strain on the memory subsystem of the allocating core. Using a lock (especially a lock that is likely to experience contention) can increase processor utilization and can slow down data processing. A processor that attempt to access a locked resource can wait idle until the resources is unlocked, thereby increasing processor utilization but not allow the processor to perform other data processing during the lock state.

Various embodiments provide multiple refill or intermediary queues that are loaded with descriptors of replacement receive buffers and the multiple refill or intermediary queues can provide descriptors of replacement buffers to a buffer queue without locking any thread that requests or causes replacement buffers to be loaded into a refill or intermediary queue. Various embodiments provide a single posting buffer (e.g., buffer queue) to post buffers to the network interface device. The buffer queue does not allocate its own buffers after initialization time, but is fed by lockless producer-consumer refill queues. Available receive buffers can be allocated and then posted into the refill queue after or when a receive buffer indicated by a completion queue is processed. A lockless refill queue allows its processor to write to its refill queue, which supplies the buffer queue. For multiple completion queues, multiple corresponding refill queues can be used to feed available receive buffers to the posting queue (e.g., buffer queue) without locking the buffer queue or any refill queue. In some examples, a refill queue is associated with a completion queue. However, in some examples, a refill queue or the buffer queue can be locked.

Various embodiments provide a lockless solution whereby receive buffers are allocated in a distributed fashion across multiple cores in the system and posted efficiently to a buffer queue without using lock or blocking on the buffer queue.

Figure 1:
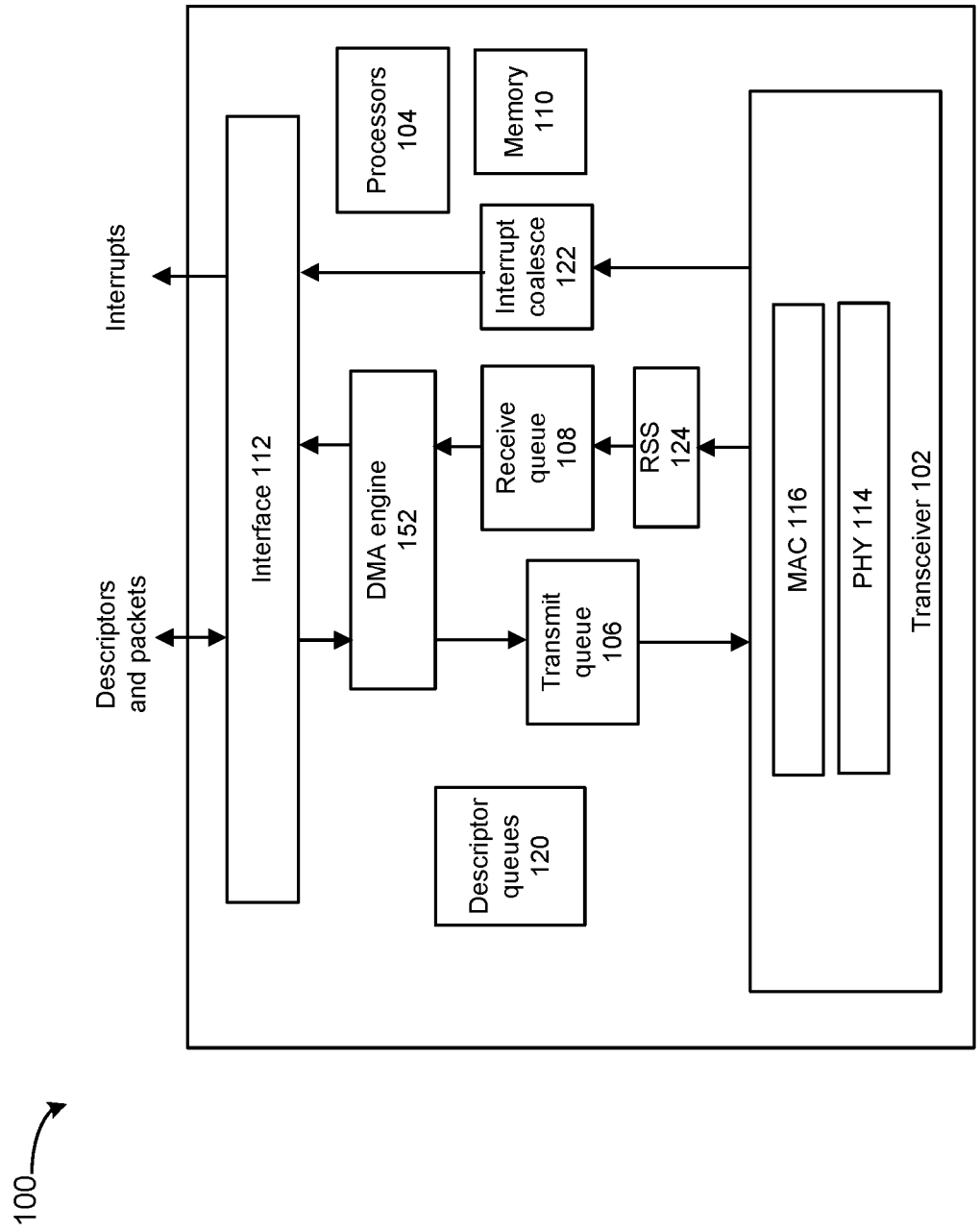
FIG. 1 depicts an example network interface.

FIG. 1 depicts an example network interface. Network interface 100 can include or access and use transceiver 102, processors 104, transmit queue 106, receive queue 108, descriptor queues 120, memory 110, bus interface 112, DMA engine 152, as well as other software or hardware devices. Transceiver 102 can be capable of receiving and transmitting packets in conformance with the applicable protocols such as Ethernet as described in IEEE 802.3, InfiniBand, as well as various wireless standards such as 802.11, Bluetooth transceiver, 3G, 4G, Long Term Evolution (LTE), or 5G, although other protocols may be used. Transceiver 102 can receive and transmit packets from and to a network via a network medium (not depicted).

Transceiver 102 can include physical layer interface (PHY) circuitry 114 and media access control (MAC) circuitry 116. PHY circuitry 114 can include encoding and decoding circuitry (not shown) to encode and decode data packets according to applicable physical layer specifications or standards. MAC circuitry 116 can be configured to assemble data to be transmitted into packets, that include destination and source addresses along with network control information and error detection hash values. MAC circuitry 116 can be configured to process MAC headers of received packets by verifying data integrity, removing preambles and padding, and providing packet content for processing by higher layers.

Processors 104 can be any combination of: a central processing unit (CPU), core, graphics processing unit (GPU), field programmable gate array (FPGA), application specific integrated circuit (ASIC), or other programmable hardware device that allow programming of network interface 100. For example, network interface 100 can implement a "smart network interface card" (smart MC) that provides packet processing capabilities in the network interface using processors 104.

According to various embodiments, a smart NIC can perform processing of packets and their contents such as one or more of: data parsing, data classification, data transformation, data encryption, a firewall for security, a layer 2 or 3 switch for traffic steering, and network visibility with possibly remote management, and providing storage services for the compute host.

Memory 110 can be any type of volatile or non-volatile memory device and can store any queue or instructions used to program network interface 100. In some examples, memory 110 can be used to store content of transmit queue 106, receive queue 108, and/or descriptor queues 120.

Transmit queue 106 can include data or references to data for transmission by network interface to a wired or wireless network medium. Receive queue 108 can include data or references to data that was received by network interface from a wired or wireless network medium. Descriptor queues 120 can include descriptors that can be used to reference data or packets in transmit queue 106 or receive queue 108 as well as descriptors that reference available receive buffers that can be used to store any portion of received packets. In accordance with various embodiments, descriptors that identify available receive buffers can be provided to network interface 100 from a host system.

Bus interface 112 can provide an interface with a host device (not depicted) or any other device (e.g. accelerator, processor, memory pool, storage node) via any connection (e.g., a fabric, interconnect, bus). For example, bus interface 112 can be compatible with PCI, PCI Express, PCI-x, Serial ATA, and/or USB compatible interface (although other interconnection standards may be used).

Direct memory access (DMA) engine 152 can copy a packet header, packet payload, and/or descriptor (or portions thereof) directly from host memory to the network interface or vice versa, instead of copying the packet to an intermediate buffer at the host and then using another copy operation from the intermediate buffer to the destination buffer.

Interrupt coalesce 122 can perform interrupt moderation whereby interrupt coalesce 122 waits for multiple packets to arrive, or for a time-out to expire, before generating an interrupt to host system to process received packet(s). For example, receive Segment Coalescing (RSC) can be performed by network interface 100 whereby portions of incoming packets are combined into segments of a packet. Network interface 100 can provide a coalesced packet to memory for access by an application, operating system, protocol processing stack, or other software or device. In addition, network interface 100 can perform interrupt moderation whereby network interface 100 waits for multiple packets to arrive, or for a time-out to expire, before generating an interrupt to host system to process received packet (s).

Various embodiments of network interface can be implemented as a disaggregated NIC whereby various features and components of the network interface are connected using interconnects, fabric, networks, or other communication techniques. For example, memory and processor used by the NIC can be separate from a PHY or MAC and connected via interconnects, fabric, networks, or other communication techniques.

In some embodiments, a network interface can be connected to another network interface via a fabric or interconnect. For example, a first network interface can provide communication in accordance with a first protocol and the first network interface is communicatively connected to a second network interface that communicates according to a second protocol. Protocols can be any of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, any memory interface standard (e.g., DDR4 or DDR5), and variations thereof.

Various embodiments of network interface can capability to communicate in accordance with Non-volatile Memory Express over Fabrics (NVMe-oF) with storage over a network. See for example, NVMe-oF is described at least in NVM Express, Inc., "NVM Express Over Fabrics," Revision 1.0, Jun. 5, 2016, and variations and revisions thereof.

Various embodiments of network interface can be implemented a system on a chip (SoC) that is within the same SoC as other processing components such as a processor or separate from the processor. A software programmable network processor integrated circuit can be used by the network interface.

Figure 2A:
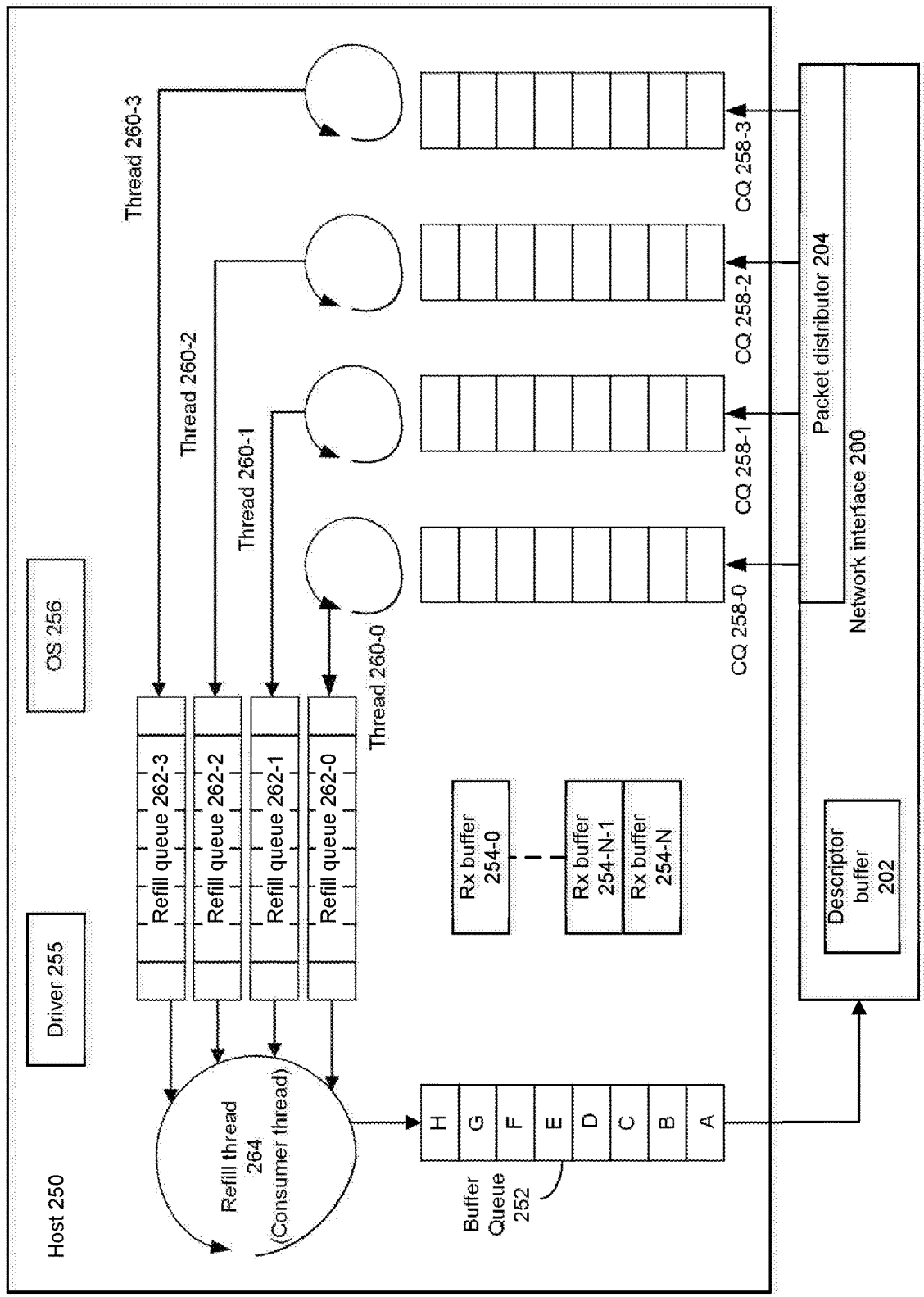
FIGS. 2A-2D depict examples whereby a host system can indicate to a network interface which receive buffers are free for use by populating a buffer queue but without locking the buffer queue.

FIGS. 2A-2D depict examples whereby a host system can indicate to a network interface which receive buffers are free for use by populating a buffer queue but without locking the buffer queue. For example, locking of the buffer queue can involve allowing merely one producer to write to the buffer queue for a time interval such that other producers are not able to write to the buffer queue. Referring to FIG. 2A, device driver 255 can create descriptors and can manage the use and allocation of descriptors in buffer queue 252. Device driver 255 can request transfer of descriptors to network interfaces from buffer queue 252. Buffer queue 252 can be allocated in a region of system memory of host 250 and include or reference descriptors of receive (Rx) buffers 254-0 to 254-N. For example, operating system (OS) 256 can allocate receive buffers 254-0 to 254-N in system memory, a processor cache, or core cache.

Buffer queue 252 can provide descriptors to descriptor buffer 202 of network interface device 200. Network interface device 200 can use descriptors to identify available receive buffers to receive packets or portions of packets, where the packets are received by network interface 200 from a wired or wireless medium. In the particular example of FIG. 2A, descriptors A-H are stored in buffer queue 252 and buffer queue 252 is used to pass descriptors A-H to network interface 200.

Thereafter, in response to receipt of a packet, network interface 200 can read a descriptor to identify a receive (Rx) buffer in which to store contents of the received packet. Network interface 200 can modify the content of a descriptor to provide a completed descriptor. For example, a completed descriptor can describe the receive buffer in which a particular received packet is stored (e.g., starting location of packet in memory) and identify features of the packet such as the length of the received packet, hash values, packet types, and checksum pass/fail. Network interface 200 can return the completed descriptor to host via a selected completion queue among completion queues 258-0 to 258-3$_{[LC1][GC2]}$.

Figure 2B:
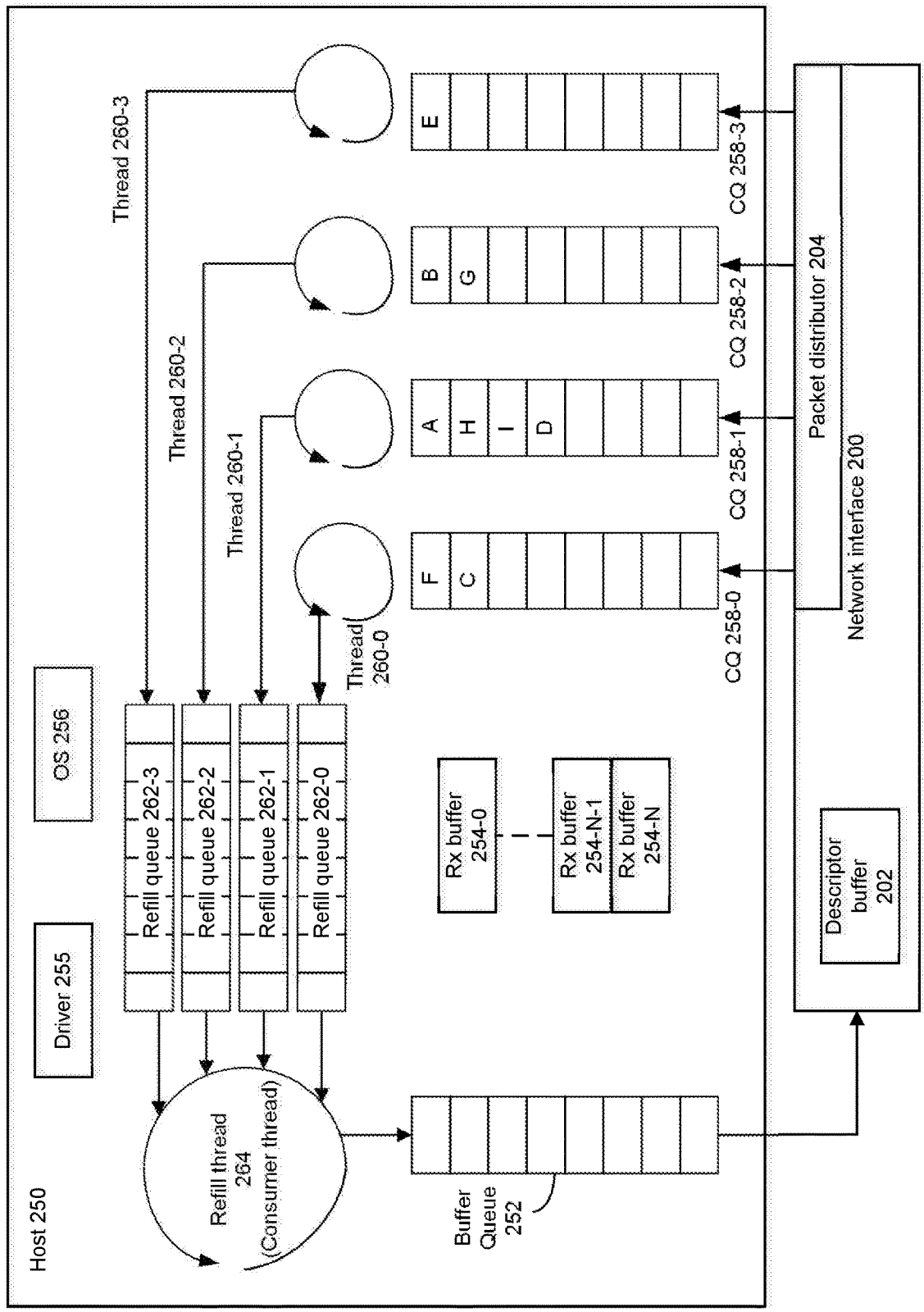

FIG. 2B depicts an example whereby completed descriptors for various receive (Rx) buffers are allocated to any of four completion queues (CQs) 258-0 to 258-3. Other numbers of completion queues can be used and the example is not limiting. Network interface 200 can use packet distributor 204 to provide completed descriptors to completion queues 258-0 to 258-3. Packet distributor 204 can use a technique such as receive side scaling (RSS) or other manner of distributing packets (or portions thereof) for processing by a particular core among multiple cores. Various cores can have an associated completion queue. For example, a first core can be associated with completion queue 258-0, a second core can be associated with completion queue 258-1, a third core can be associated with completion queue 258-2, and fourth core can be associated with completion queue 258-3.

In other examples, instead of allocating a core to a particular completion queue, one or more threads operating on a single or multiple cores or devices can process packets identified by descriptors in a particular completion queue. For example, a thread can be a unit of execution of concurrent programming. Multithreading is a technique which allows a central processing unit to execute multiple tasks of one process (e.g., processor executed instructions) at the same time and the threads can execute individually while sharing their resources. A reference to a core can additionally, or alternatively, refer to one or more threads operating on a single or multiple cores or devices. References to core can in addition or alternatively refer to a central processing unit (CPU), graphics processing unit (GPU), field programmable gate array (FPGA), accelerator device, or application specific integrated circuit (ASIC).

Distributing packets for processing by a selected core can include allocating a packet to a completion queue (e.g., one of CQ 258-0 to CQ 258-3 in this example) that is associated with the selected core. A DMA engine (not shown) can be used to copy packets (e.g., header or payload) or portions thereof to a receive buffer and also provide associated completed descriptors to a selected completion queue. Completed descriptors provided in a CQ can refer to content of one or more received packets stored in a receive (Rx) buffer.

A core associated with a CQ can execute a thread to process contents of the one or more packets. For example, a software thread executed by a core can processes content stored in a receiver buffer and referenced by one or more descriptors in a completion queue.

In the specific example of FIG. 2B, a CQ 258-0 includes completed descriptors F and C; CQ 258-1 includes completed descriptors A, H, I, and D; CQ 258-2 includes completed descriptors B and G; and CQ 258-3 includes a completed descriptor E. For example, a thread 260-0 (e.g., executing a driver) executing on core 0 (not shown) associated with CQ 258-0 can indicate to operating system (OS) 256 that receive buffers associated with descriptors F and C are available for processing. A thread executed by a core can process contents of a receive buffer identified by a descriptor. For example, OS 256 can perform packet processing in accordance with applicable protocols on contents of receive buffers associated with descriptors F and C. Similar operations can occur by respective threads 260-1 to 260-3 to cause packet processing of content in receive buffers identified by completed descriptors in CQ 258-1 to 258-3.

OS 256 can implement one or more protocol stacks that process packets. An example of a protocol stack is a TCP/IP (Transport Control Protocol/Internet Protocol) protocol stack with one or more programs for handling (e.g., processing or generating) packets for transmission or after receipt. Other protocols can be processed such as User Datagram Protocol (UDP).

Other operations of OS 256 can include management of system resources and controlling tasks that are run on host 250. For example, OS 256 may be implemented using Microsoft Windows, HP-UX, Linux, MacOS, iOS, Android, or UNIX, although other operating systems may be used. In one embodiment, OS 256 can be executed by one or more of a processing core. In one embodiment, OS 256 can be replaced by a virtualized execution environment which may provide a layer of abstraction for underlying hardware to various operating systems running on one or more processors.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Figure 2C:
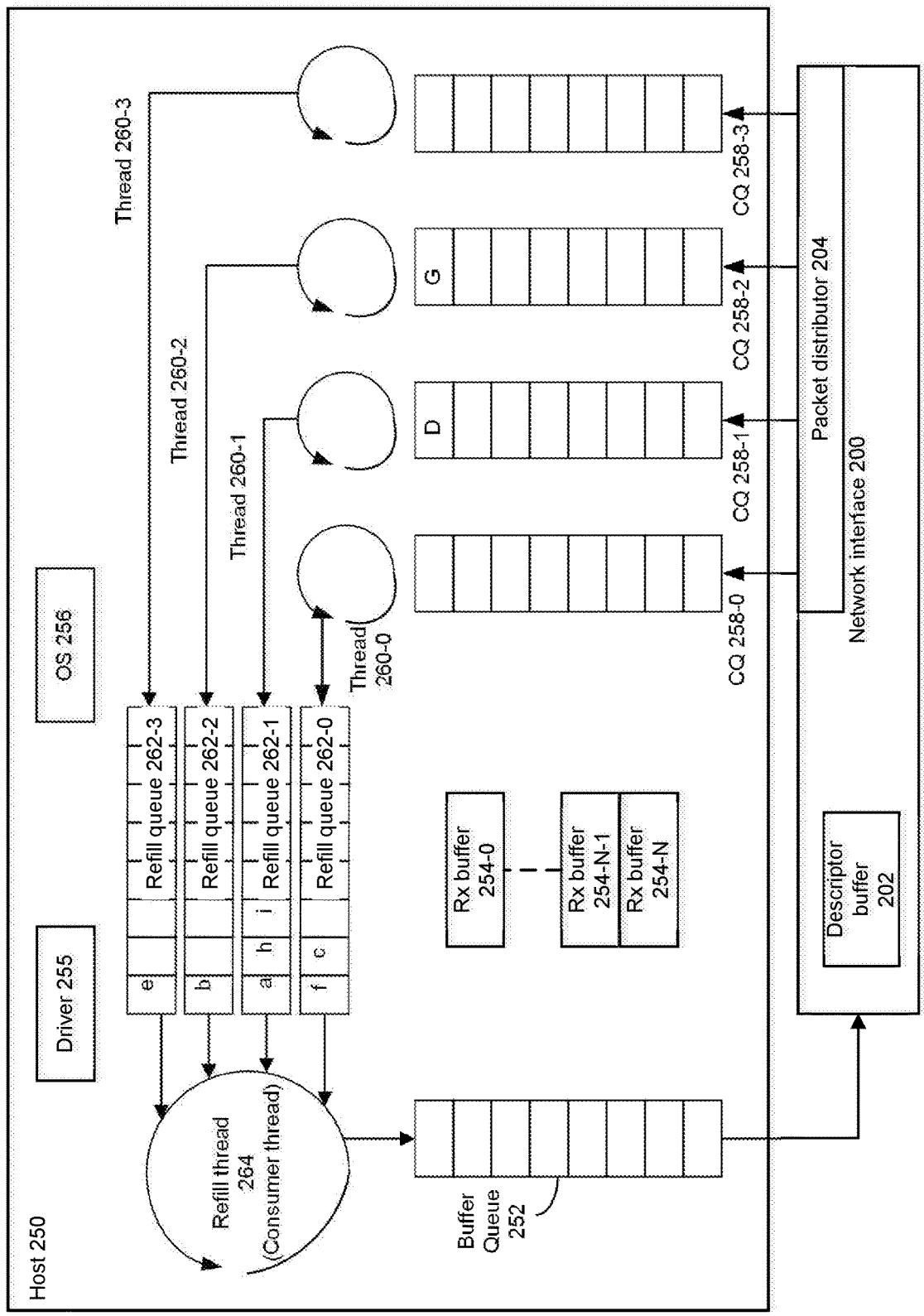

After processing of contents in a receive buffer, the receiver buffer can be made available for other uses or to store contents of other received packets or other uses. In some embodiments, refill queues 262-0 to 262-3 are used to identify available receiver buffers and the available receiver buffers can be made available via buffer queue 252 for use by network interface 200 at least to store portions of received packets. For example, FIG. 2C depicts an example manner of using refill queues 262-0 to 262-3 to provide available or replacement receive buffers via descriptors to buffer queue 252. In some examples, refill queues 262-0 to 262-3 are used to provide available descriptors to buffer queue 252. In some examples, refill queues 262-0 to 262-3 can provide available descriptors from respective completion queues 258-0 to 258-3. An available descriptor can, in some cases, identify an associated receive buffer. In this specific example, contents of receive buffers associated with descriptors F and C associated with CQ 258-0, descriptors A, H, and I associated with CQ 258-1, descriptor B associated with CQ 258-2, and descriptor E associated with CQ 258-3 have been processed and the descriptors are available for use to identify free receiver buffers.

A thread can load a refill queue with one or more descriptors that identify available receive buffers in a manner that does not lock or block other threads from load other refill queues. In other words, refill queues can be independently loaded with descriptors indicating available receiver buffers. For example, refill queue 262-0 associated with CQ 258-0 can be loaded with one or more descriptors at the same time as any of refill queues 262-1 to 262-3 that are associated with respective CQs 258-1 to 258-3.

Various examples of associating a receive buffer with an available descriptor and providing the available descriptor to a refill queue are described next. For example, for receiver buffers identified as completed by descriptors in CQ 258-0, a thread executed by a core (e.g., OS) can allocate an equivalent number of receive buffers and post descriptors associated with receive buffers in refill queue 262-0 in a manner that does not lock or block another thread from writing to a refill queue. For example, when OS 256 is the Linux operating system or a derivative thereof, after indicating availability of received queues associated with descriptors F and C to OS 256 (FIG. 2B), thread 260-0 can request OS 256 for two receive buffers. OS 256 can allocate new receive buffers by use of descriptors f and c. Receive buffers associated with descriptors f and c can but may not be the same memory regions as receive buffers associated with descriptors F and C. Thread 260-0 provides descriptors f and c to refill queue 262-0 associated with CQ 258-0. Similar operations occur for requesting replacement receive buffers associated with receive buffers carried by CQ 258-1 to 258-3.

Continuing with an example of processing of completed descriptors in CQ 258-0, in some examples, when OS 256 is Microsoft® Windows® or derivative thereof, thread 260-0 (e.g., driver) indicates descriptors F and C are available for processing to the OS. When a driver provides or makes available descriptors F and C to OS 256, OS 256 waits for processing of receive buffers associated with F and C to complete. OS 256 or its delegate processes contents of receive buffers associated with F and C (e.g., packet processing or application thread execution) and provides receive buffers associated with descriptors f and c to a driver. In this example, descriptors f and c reference the same receive buffers as those referenced by respective descriptors F and C. A thread executing a driver (e.g., thread 260-0) copies descriptors f and c into refill queue 262-0. Descriptors f and c could be provided to refill queue 262-0 by a same or different core from core that is to execute a driver.

Available receive buffers identified using descriptors f and c can be provided to refill queue 262-0 one at a time or in a group at a timed interval or after a threshold number of descriptors are available. For example, descriptors f and c can be provided to refill queue 262-0 at a timed interval or after a threshold number of buffers (e.g., 2) are available.

Similar operations occur for refill or replacement receive buffers based on processing of content associated with descriptors A, H, and I for CQ 258-1, B for CQ 258-2, and E for CQ 258-3. In FIG. 2C, available descriptors a, h, and i in refill queue 262-1 can correspond to descriptors A, H, and I from CQ 258-1. Available descriptors b and e in respective refill queues 262-2 and 262-3 can correspond to descriptors B and E from respective CQ 258-2 and CQ 258-3. Receive buffers associated with descriptors a, h, i, b, and e can but may not be the same memory regions as receive buffers associated with descriptors A, H, I, B, and E.

A refill queue can be implemented as a circular queue with a head pointer and tail pointer. A thread (e.g., producer) that writes descriptors to a refill queue writes at a position indicated by a head pointer, whereas a consumer thread (e.g., refill thread 264) reads from a position identified by a tail pointer location. The producer advances the head pointer after a write and the consumer advances the tail pointer after reading one or more descriptors. But if the head and tail point to the same location, then no reading or writing takes place. A consumer can only advance the tail pointer up to the head pointer.

Figure 2D:
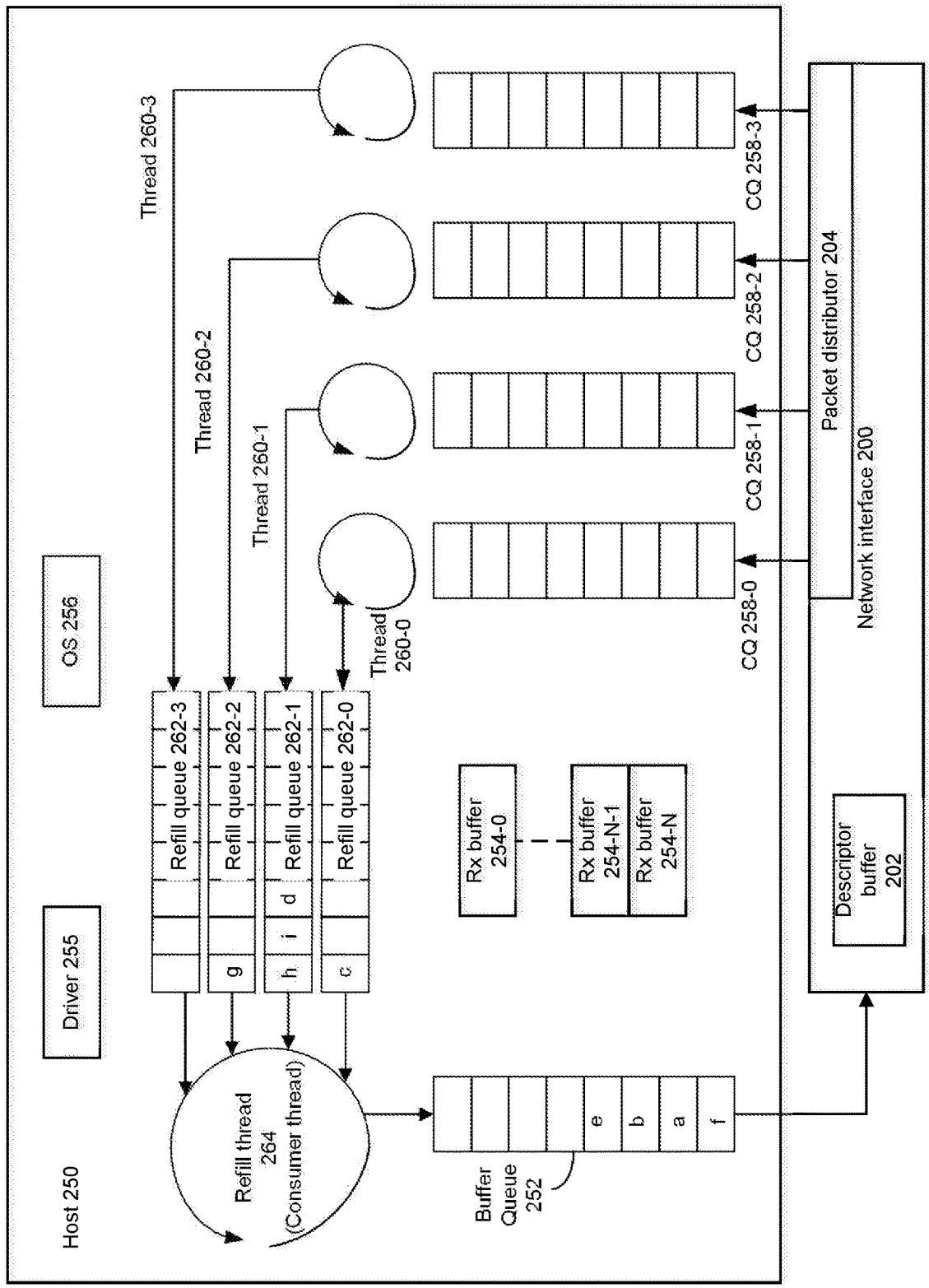

FIG. 2D depicts an example by which one or more refill threads 264 can copy contents of any of refill queues 262-0 to 262-3 to buffer queue 252 according to an applicable scheme without locking or blocking a thread from reading from a refill queue and writing to buffer queue 252. In some examples, a refill thread can execute an instance of a network interface driver or other software. For example, locking buffer queue 252 can involve permitting a thread to write-to buffer queue 252 but not allowing another thread to write-to buffer queue 252. For example, the scheme can be a round robin selection scheme that copies a particular number of buffer descriptors from a refill queue, then proceeds to copy the same number (if available) from a next refill queue, and so forth. Another scheme could be the one or more threads copy all buffer descriptors in a single refill queue to buffer queue 252 and proceed to a next refill queue. In some cases, if an insufficient number of enough descriptors are available, then refill thread 264 can wait until a threshold number of descriptors is available before copying any available descriptor from a refill queue to buffer queue 252, even in excess of the threshold number.

In some examples, refill thread 264 can check a refill queue for available descriptors, accumulate descriptors in batches (to avoid too many memory-mapped I/O (MMIO) writes), copy batches of descriptors to buffer queue 252, and exit when all refill queues are empty.

In the specific example of FIG. 2D, a round robin selection scheme is used. Refill thread 264 causes descriptors f, a, b, and e to be copied from respective refill queues 262-0 to 262-3 to buffer queue 252. In addition, available descriptors d and g are added to respective refill queues 262-1 and 262-3 based on processing of respective descriptors D and G from CQ 258-1 and 258-3.

Thereafter, network interface 200 can receive or pull available descriptors from buffer queue 252 to descriptor buffer 202. Network interface 200 can use available descriptors to allocate portions of received packets to available receiver buffers for processing and provide completed descriptors that identify where packet portions are stored in memory to completion queues used by host 250.

Note that while description of refill queues to provide available replacement buffers is made with respect to received packets from a network interface, refill queues can be used to indicate available replacement buffers for a switch, an accelerator, a service function chain, or any environment in which data or content is transferred from one buffer to another buffer. In addition, refill queues can provide available replacement buffers to store content to be transmitted.

Figure 3:
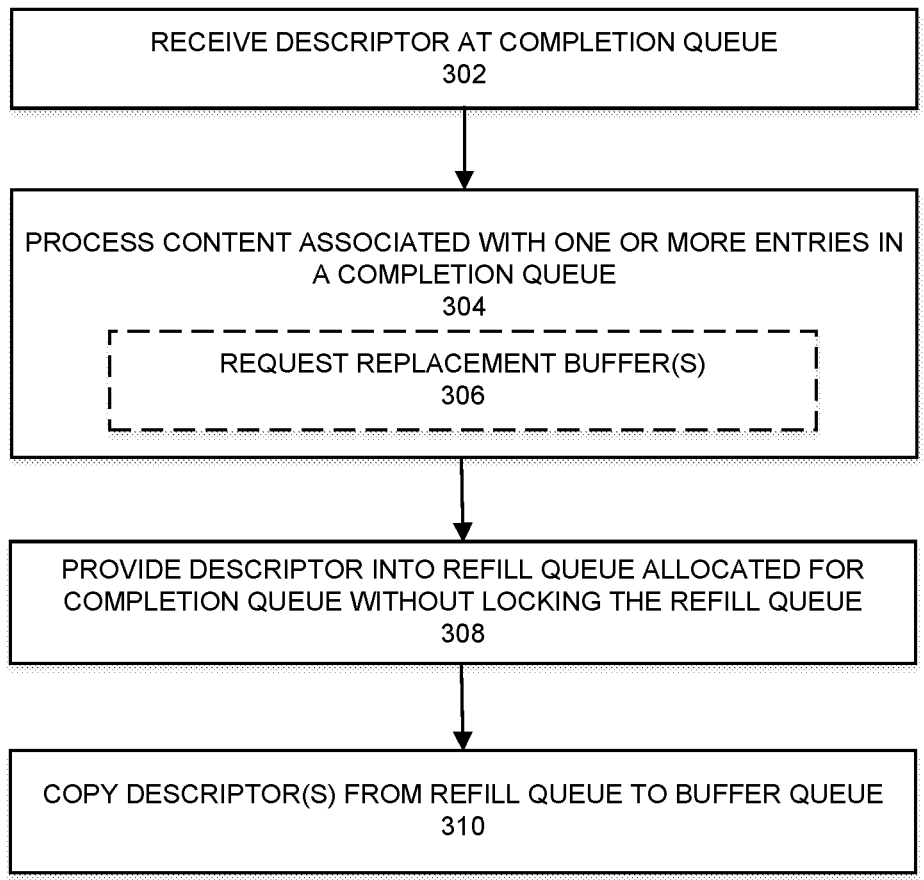
FIG. 3 depicts an example process.

FIG. 3 depicts an example process. The process can be performed by one or more of: a host device with a processor, one or more cores, a cache allocated to a single core or shared among cores, a memory, and an interface to a network interface. At 302, a completion queue can receive a descriptor. The descriptor can describe a receive buffer in which a particular received packet (or portion thereof) is stored (in memory or cache) and identify features of the packet such as starting memory location of the packet, the length of the received packet, hash values, packet types, and checksum pass/fail. The completion queue can be one of a plurality of completion queues. A completion queue can be associated with a core, central processing unit (CPU), or thread.

At 304, a core associated with the completion queue can process content of a receive buffer associated with one or more descriptors in a completion queue. The processor core can perform protocol processing on contents of received packets, in addition to performing other tasks such as execution of an application that uses content of the received packets (e.g., data, image content, video content, web page, or other executable code). In some examples, 304 can include 306, whereby the core can execute a thread (e.g., driver instance) that indicates that content of a receive buffer has been processed or is being processed and requests a number of replacement buffers that correspond to the number of receive buffers whose content has been processed or is being processed. In some examples, an operating system can provide the number of replacement buffers for allocation via one or more descriptors. The core that processes content of a receive buffer can be the same as the core that requests one or more replacement receive buffers.

At 308, one or more replacement receive buffers can be provided to a refill queue. The one or more replacement receive buffers can be identified using one or more descriptors. In some examples, replacement of a same number of descriptors whose associated receive buffers have been processed takes place. A thread can be executed to monitor for available replacement buffer(s) and copy associated descriptors into a refill buffer. In one example, a completion queue can have a corresponding refill queue. Refill queues can be loaded or read-from independent of one another so that no thread is locked from writing to a refill queue while any thread writes-to or reads-from another refill queue.

A 310, one or more descriptors associated with replacement buffers in a refill queue are provided to a buffer queue. The buffer queue does not have to be locked or blocked during receipt of descriptors. In addition, refill queues having contents written to the buffer queue do not have to be locked or blocked. Various schemes can be used to copy descriptors from multiple refill queues to the buffer queue. A round robin selection scheme can be used that copies a particular number of descriptors from a refill queue to the buffer queue, then proceeds to copy the same number (if available) from a next refill queue to the buffer queue, and so forth. Another scheme could be the one or more threads copy all buffer descriptors in a single refill queue to the buffer queue and goes to next refill queue.

Figure 4:
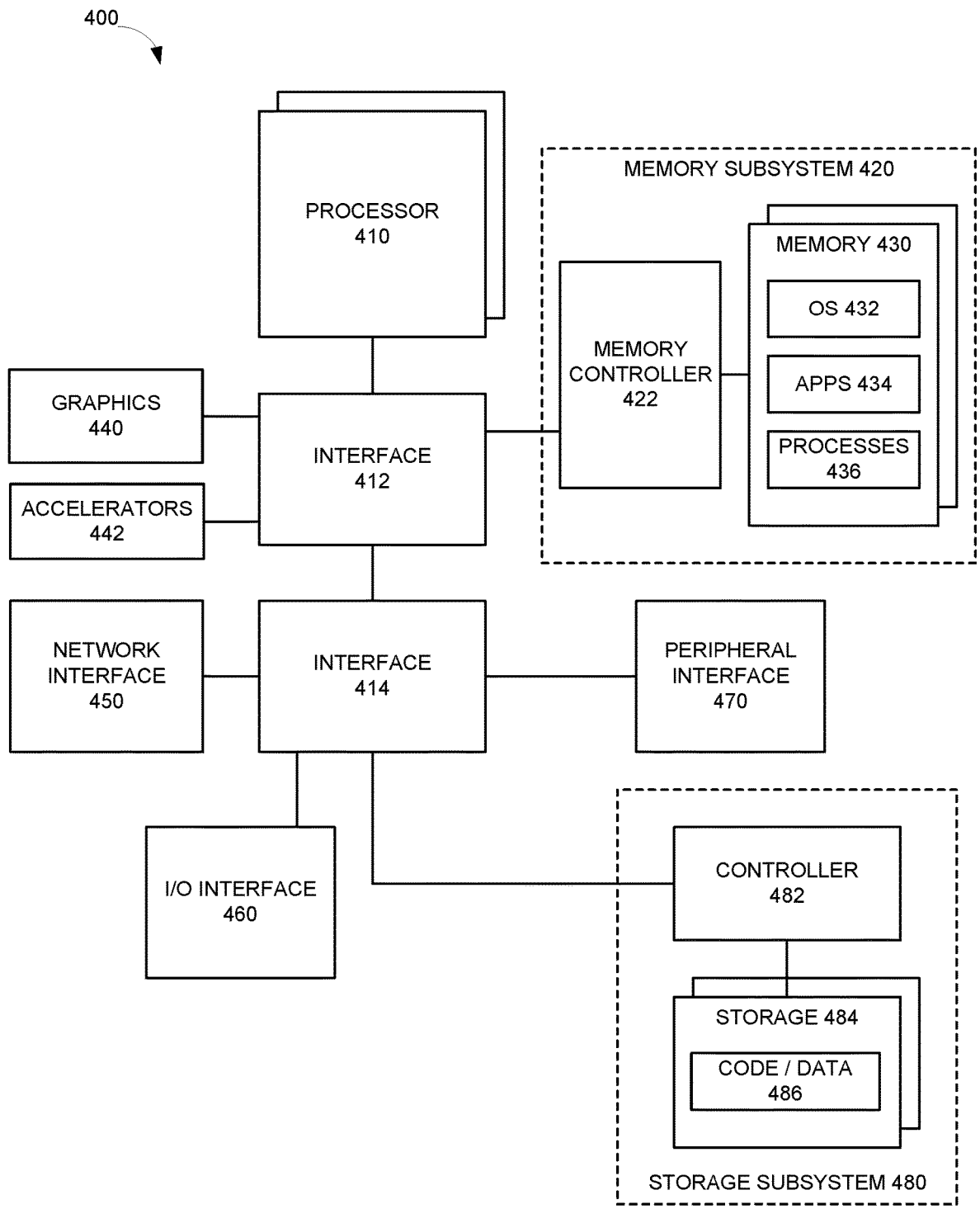
FIG. 4 depicts a system.

FIG. 4 depicts a system. Any connection of the system such as any interface or network interface capable of assigning content for processing can used embodiments described herein. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function offload engine that can be accessed or used by a processor 410. For example, an accelerator among accelerators 442 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 1046 in a persistent state (i.e., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (i.e., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various embodiments can be used in a base station that supports communications using wired or wireless protocols (e.g., 3GPP Long Term Evolution (LTE) (4G) or 3GPP 5G), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 5:
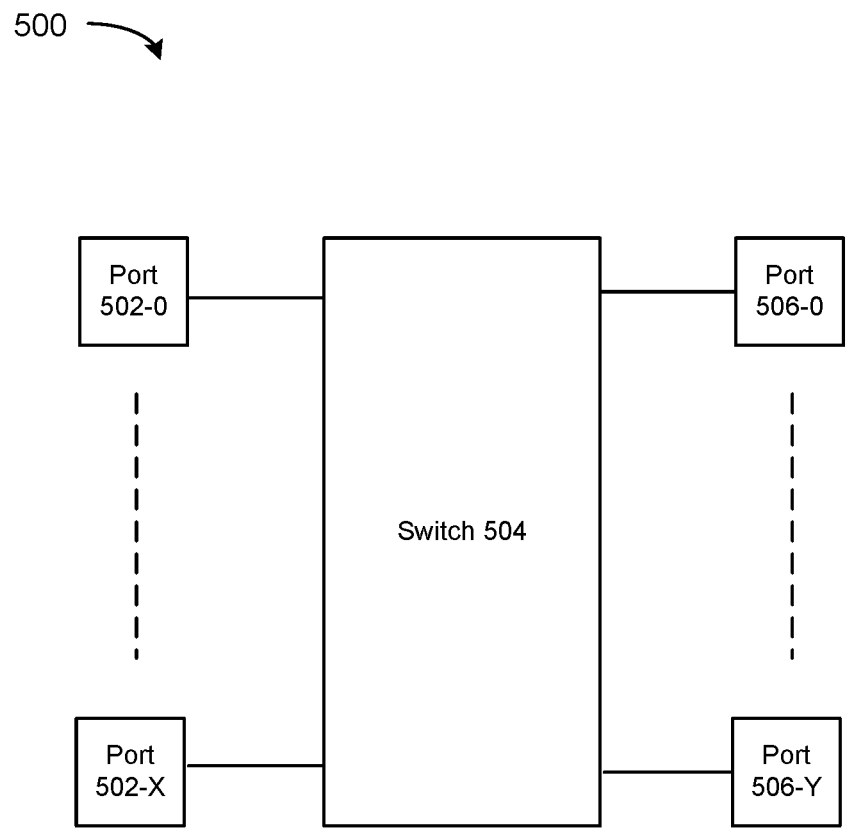
FIG. 5 depicts an example switch.

FIG. 5 depicts an example switch. Various embodiments can be used in or with the switch of FIG. 5 to allocate receive buffers for content received at the switch for storage or for storage prior to transmission. Switch 504 can route packets or frames of any format or in accordance with any specification from any port 502-0 to 502-X to any of ports 506-0 to 506-Y (or vice versa). Any of ports 502-0 to 502-X can be connected to a network of one or more interconnected devices. Similarly, any of ports 506-0 to 506-X can be connected to a network of one or more interconnected devices. Switch 504 can decide which port to transfer packets or frames to using a table that maps packet characteristics with an associated output port. In addition, switch 504 can perform packet replication for forwarding of a packet or frame to multiple ports and queuing of packets or frames prior to transfer to an output port.

Figure 6:
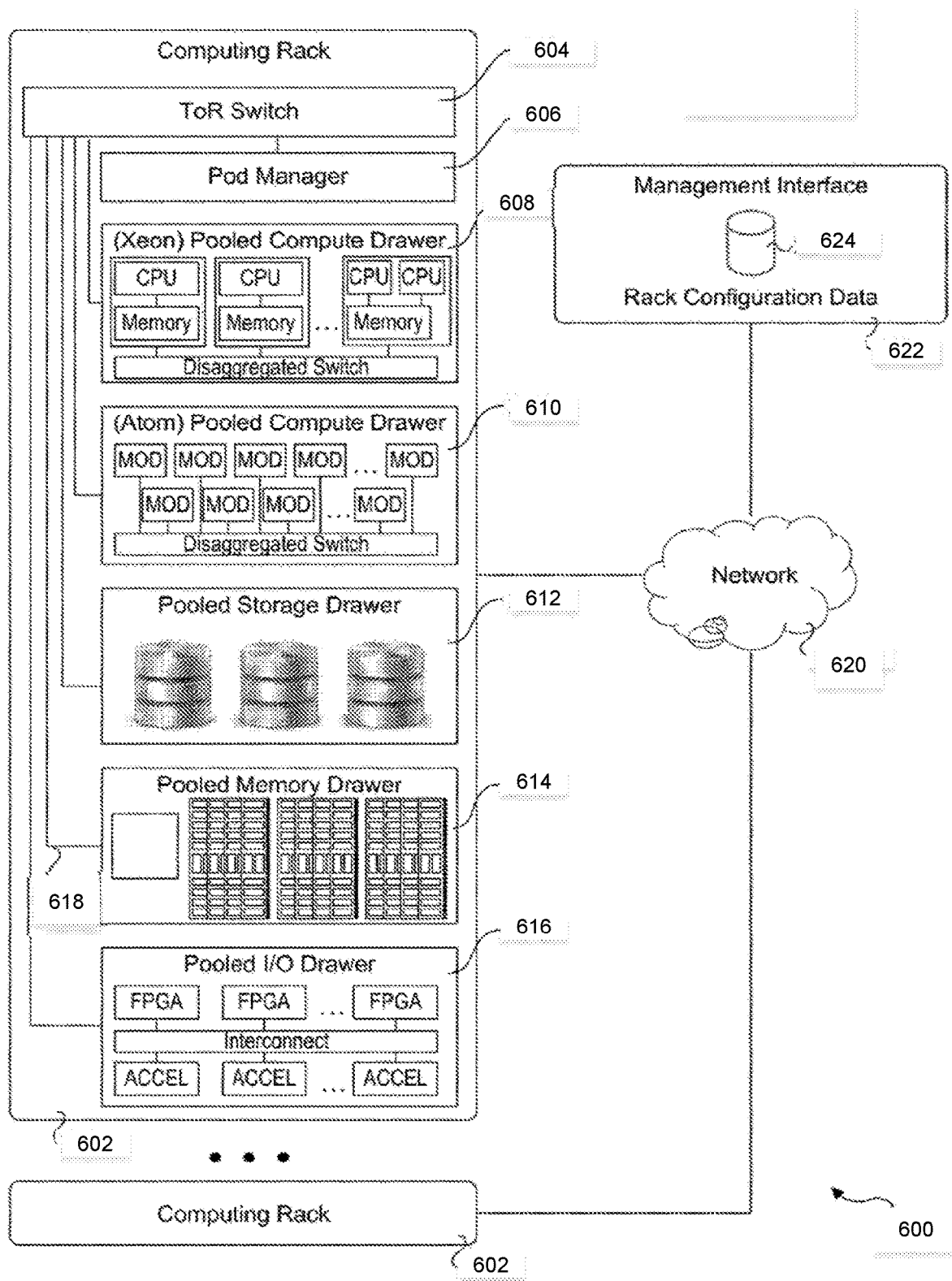
FIG. 6 depicts an environment.

FIG. 6 depicts an environment 600 includes multiple computing racks 602, one or more of the racks including a Top of Rack (ToR) switch 604, a pod manager 606, and a plurality of pooled system drawers. Various embodiments can be used in or with the environment of FIG. 8 to allocate receive buffers for content received at the switch for storage or for storage prior to transmission. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 608, and Intel® ATOM™ pooled compute drawer 610, a pooled storage drawer 612, a pooled memory drawer 614, and a pooled I/O drawer 616. One or more of the pooled system drawers is connected to ToR switch 604 via a high-speed link 618, such as a 40 Gigabit/second (Gb/s) or 100 Gb/s Ethernet link or a 100+ Gb/s Silicon Photonics (SiPh) optical link. In one embodiment high-speed link 618 comprises an 800 Gb/s SiPh optical link.

Multiple of the computing racks 600 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage all of the racks in the pod. Alternatively, distributed pod managers may be used for pod management operations.

Environment 600 further includes a management interface 622 that is used to manage various aspects of the environment. This includes managing rack configuration, with corresponding parameters stored as rack configuration data 624.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, core, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an apparatus that includes a memory and at least one processor to: identify at least one available receive buffer from a refill queue without preventing identification of an available receive buffer from another refill queue and provide indications of available receive buffers to a network interface.

Example 2 includes any example, wherein the at least one processor is to: receive identification of an available receive buffer in a refill queue without locking any other refill queue from receiving an indication of an available receive buffer.

Example 3 includes any example, wherein the at least one processor is to: receive, at a buffer queue, indications of available receive buffers from multiple refill queues according to a round robin selection manner.

Example 4 includes any example, wherein the at least one processor is to: receive, at a buffer queue, indications of available receive buffers from multiple refill queues by access of any available receive buffer of a first refill queue followed by access of any available receive buffer from another refill queue.

Example 5 includes any example, wherein the at least one processor is to copy content of a refill queues to the buffer queue.

Example 6 includes any example, wherein an available receive buffer comprises a buffer in a region of memory and/or cache that is available to store a portion of a packet.

Example 7 includes any example and including completion queues and associated refill queues, wherein a completion queue is to store a descriptor that references at least one receive buffer that stores content available for processing.

Example 8 includes any example, wherein the at least one processor is to allocate a replacement receive buffer based on processing of content of a receive buffer that stores content available for processing.

Example 9 includes any example, wherein to provide indications of available receive buffers to a network interface, the at least one processor is to access a buffer queue to provide descriptors that reference available receive buffers to the network interface.

Example 10 includes any example, and includes a network interface communicatively coupled to the memory.

Example 11 includes any example, and includes a data server, processor-executed operating system, or processor-executed virtualized execution environment.

Example 12 includes a method that includes: permitting writing available receive buffers from multiple refill queues to a buffer queue without locking any refill queue.

Example 13 includes any example, wherein permitting writing available receive buffers from multiple refill queues to a buffer queue without locking any refill queue comprises accessing content from a refill queue followed by accessing content from another refill queue.

Example 14 includes any example, wherein permitting writing available receive buffers from multiple refill queues to a buffer queue without locking any refill queue comprises accessing available content of a refill queue followed by accessing the threshold amount of content from another refill queue.

Example 15 includes any example, wherein the available receive buffers comprise buffers in a region of memory.

Example 16 includes any example, wherein the available receive buffers comprise buffers in a region of cache.

Example 17 includes any example, and includes: providing available receive buffers from a buffer queue to a network interface.

Example 18 includes a system that includes at least one network interface; at least one memory; and at least one processor coupled to the at least one network interface and the at least one memory, wherein the at least one processor is to: identify indications of available receive buffers from multiple refill queues without locking any other indication of an available receive buffer and provide indications of available receive buffers to a network interface of the at least one network interface.

Example 19 includes any example, wherein identify indications of available receive buffers from multiple refill queues without locking any other indication of available receive buffers comprises receive an indication of an available receive buffer in a refill queue without locking of any other refill queue from receiving an indication of an available receive buffer.

Example 20 includes any example, wherein the at least one processor is to provide indications of available receive buffers to a network interface of the at least one network interface comprises access a buffer queue to provide descriptors that reference available receive buffers to the network interface.

Example 21 includes any example and includes one or more of: a data center, server, edge computing device, fog computing device.

What is claimed is:

1. An apparatus comprising:
    at least one memory and
    at least one processor, to execute instructions stored in the at least one memory, that cause the at least one processor to:
        cause allocation of completion queues and multiple refill queues in the at least one memory, wherein a completion queue of the completion queues is to store a descriptor that is to reference at least one receive buffer that is to store content available for processing;
        identify at least one available receive buffer from a refill queue of the multiple refill queues without preventing identification of an available receive buffer from another refill queue of the multiple refill queues;
        provide indications of available receive buffers to a network interface; and
        allocate a replacement receive buffer based on processing of content of a receive buffer of the at least one receive buffer.

2. The apparatus of claim 1, wherein the at least one processor is to execute instructions stored in the at least one memory that cause the at least one processor to:
    receive identification of an available receive buffer in a refill queue of the multiple refill queues without locking another refill queue from receipt of an indication of an available receive buffer.

3. The apparatus of claim 1, wherein the at least one processor is to execute instructions stored in the at least one memory that cause the at least one processor to:
    receive, at a buffer queue, indications of available receive buffers from the multiple refill queues according to a round robin selection manner.

4. The apparatus of claim 1, wherein the at least one processor is to execute instructions stored in the at least one memory that cause the at least one processor to:
    receive, at a buffer queue, indications of available receive buffers from the multiple refill queues by access of an available receive buffer of a first refill queue of the multiple refill queues followed by access of an available receive buffer from a second refill queue of the multiple refill queues.

5. The apparatus of claim 1, wherein the at least one processor is to execute instructions stored in the at least one memory that cause the at least one processor to: copy content of a refill queue to a buffer queue.

6. The apparatus of claim 1, wherein an available receive buffer of the available receive buffers comprises a buffer in a region of the at least one memory and/or cache that is available to store a portion of a packet.

7. The apparatus of claim 1, wherein to provide indications of available receive buffers to a network interface, the at least one processor is to access a buffer queue to provide descriptors that reference the available receive buffers to the network interface.

8. The apparatus of claim 1, further comprising the network interface communicatively coupled to the at least one memory and the at least one processor.

9. The apparatus of claim 1, further comprising a data server, processor-executed operating system, or processor-executed virtualized execution environment, wherein the data server, processor-executed operating system, or processor-executed virtualized execution environment is to access a received packet from a receive buffer of the available receive buffers.

10. A method comprising:
    allocating completion queues, wherein a completion queue of the completion queues stores a descriptor that references at least one receive buffer that stores content available for processing;
    allocating multiple refill queues;
    identifying a receive buffer of the at least one receive buffer as available based on processing of content of the receive buffer of the at least one receive buffer;
    identifying at least one available receive buffer from a refill queue of the multiple refill queues;
    permitting writing of at least one available receive buffer from a refill queue of the multiple refill queues to a buffer queue without locking another refill queue of the multiple refill queues; and
    indicating an available receive buffer from the buffer queue to a network interface device.

11. The method of claim 10, wherein permitting writing of at least one available receive buffer from a refill queue of the multiple refill queues to a buffer queue without locking another refill queue of the multiple refill queues comprises accessing content from a first refill queue of the multiple refill queues followed by accessing content from a second refill queue of the multiple refill queues.

12. The method of claim 10, wherein permitting writing of at least one available receive buffer from a refill queue of the multiple refill queues to a buffer queue without locking another refill queue of the multiple refill queues comprises accessing available content of a first refill queue of the multiple refill queues followed by accessing an amount of content from a second refill queue of the multiple refill queues.

13. The method of claim 10, wherein the receive buffer of the at least one receive buffer identified as available comprises a buffer in a region of memory.

14. The method of claim 10, wherein the receive buffer of the at least one receive buffer identified as available comprises a buffer in a region of cache.

15. A system comprising:
at least one network interface;
at least one memory; and
at least one processor coupled to the at least one network interface and the at least one memory, wherein the at least one processor is to:
cause allocation of completion queues and multiple refill queues in the at least one memory, wherein a completion queue of the completion queues is to store a descriptor that is to reference at least one receive buffer that is to store content available for processing;
identify indications of available receive buffers from a first refill buffer of the multiple refill queues without locking another indication of an available receive buffer from a second refill buffer of the multiple refill queues;
provide indications of available receive buffers to a network interface of the at least one network interface; and
identify a replacement receive buffer based on processing of content of a receive buffer of the at least one receive buffer.

16. The system of claim 15, wherein identify indications of available receive buffers from a first refill buffer of multiple refill queues without locking another indication of an available receive buffer from a second refill buffer of the multiple refill queues comprises receive an indication of an available receive buffer in a refill queue without locking of another refill queue from receiving an indication of an available receive buffer.

17. The system of claim 15, wherein the provide indications of available receive buffers to a network interface of the at least one network interface comprises access a buffer queue to provide descriptors that reference the available receive buffers to the network interface.

18. The system of claim 15, comprising one or more of: a data center, server, edge computing device, or fog computing device, wherein the data center, server, edge computing device, or fog computing device include the at least one memory and the at least one processor.

19. A computer-readable medium comprising instructions stored thereon, that if executed by one or more processors, cause the one or more processors to:
execute an operating system (OS) to:
cause storage of multiple completion queues and multiple refill queues, wherein a completion queue of the multiple completion queues is to store a descriptor that references at least one receive buffer that is to store content available for processing;
select from one of the multiple refill queues;
select a descriptor from the selected one of the multiple refill queues with no locking of another of the multiple refill queues;
provide the selected descriptor from the selected one of the multiple refill queues to an output queue, wherein a network interface is to access the selected descriptor from the output queue; and
allocate a replacement receive buffer based on processing of content of a receive buffer of the at least one receive buffer.

20. The computer-readable medium of claim 19, wherein the descriptor includes an identification of an available receive buffer.

* * * * *